United States Patent [19]

Wunsch

[11] Patent Number: 4,924,997
[45] Date of Patent: May 15, 1990

[54] CONVEYING PLANT

[76] Inventor: Adolf Wunsch, Ried 215 D-8959, Seeg, Fed. Rep. of Germany

[21] Appl. No.: 85,878

[22] Filed: Aug. 14, 1987

[30] Foreign Application Priority Data

Aug. 16, 1986 [DE] Fed. Rep. of Germany ....... 3627866

[51] Int. Cl.5 .............................................. B65G 15/64
[52] U.S. Cl. ..................................... 198/345; 198/774
[58] Field of Search ..................... 198/345, 774, 346.1, 198/465.2; 29/33 P, 563

[56] References Cited

U.S. PATENT DOCUMENTS

| 2,745,167 | 5/1956 | Cross | 29/33 P |
|---|---|---|---|
| 2,982,004 | 5/1961 | Cross | 29/33 P |
| 4,217,978 | 8/1980 | Stalker | 198/345 |
| 4,407,404 | 10/1983 | Rise et al. | 198/774 |
| 4,669,607 | 6/1987 | Mason | 198/774 |
| 4,710,122 | 12/1987 | Villanueva | 198/465.2 X |

FOREIGN PATENT DOCUMENTS 2164087  6/1973 Fed. Rep. of Germany .
2756096  6/1978 Fed. Rep. of Germany .

Primary Examiner—Frank E. Werner
Assistant Examiner—Cheryl L. Gastineau
Attorney, Agent, or Firm—Notaro & Michalos

[57] ABSTRACT

Below a series of processing units as bending and assembling tools a guide rail (12) for a plurality of carriers (20) for work pieces (18) is arranged. The guide rail (12) has a longitudinal bottom slot through which equally spaced dogs (36) of a conveying rail (34) can engage with the carriers (20). The conveying rail (34) is repeatedly moved along a rectangle path including a working stroke with the dogs (36) in working engagement with the carriers (20) and including a return stroke by-passing that carriers (20). Clamping devices (62) clamp the carriers (20) in their working positions at the guide rail (12) during the rectangle path of the conveying rail (34) excluding the working stroke. Work pieces (18) of different shape and size can be conveyed through a processing and assembling machine without requiring modifications of the conveying system.

7 Claims, 9 Drawing Sheets

CONVEYING PLANT

BACKGROUND OF THE INVENTION

The invention relates to a conveying plant for work pieces to be processed or assembled one after another at different working positions comprising a guide rail extending longitudinally at said working positions, a push-in device arranged at one end of the guide rail and a push-out device at the other end thereof, a conveying rail arranged parallely with and adjacent to the guide rail, a plurality of dogs provided at the conveying rail at equal interspaces, a drive unit operatively connected with the conveying rail and moving the conveying rail along a continuously repeated substantially rectangular moving path consisting of a working stroke in longitudinal direction of the guide rail, a disengaging stroke, a return stroke parallel with the working stroke and a reengaging stroke.

A conveying plant of this kind is known from West German patent application No. 21 64 087. It is true that no push-in and push-out devices are shown there, however, such devices belong to automatic conveying plants.

Another conveying plant is known from West German patent application No. 27 56 096. In this known art a pair of conveying rails are used having a plurality of recesses facing one another respectively such said each pair of recesses of both conveying rails forms a pair of clamping jaws for a specially shaped article. Both rails are mounted for common longitudinal motions and oppositely directed transverse motions. In contrast to the art mentioned before no stationary guide rails are present. The articles to be processed must be held by intermediate grippers or the like when the rails move away from one another.

In modern flexible fabrication systems different work pieces are processed and assembled in one and the same processing machine for example a bending machine. Both that known conveying machines need specially shaped conveying rails which are adapted to the special type of work pieces. In order to transport another kind of work piece the conveying rails must be replaced by rails of different shape. A further disadvantage of the known conveying plants must be seen in that additional holding means are required to hold the work pieces during the processing operations as in the aformentioned German publication No. 21 64 087 or after that processing operations when the rails open the clamping areas as in the publication No. 27 56 096.

Indeed additional gripping tools could be mounted at each working station however, those tools must be exchanged when different shaped work pieces are to be handled. With the guiding rails in the German publication No. 21 64 087 no clamping function can be achieved. The work pieces merely rest on that guiding rail and any lateral supporting surfaces are missed. If guiding rails would be used having a holding function for the special work pieces, that guiding rails would have be exchanged too when work pieces of different shapes and sizes are to be processed.

SUMMARY OF THE INVENTION

One object of the invention is to provide a conveying plant which is capable to transport work pieces of different sizes and shapes without retooling the plant as a whole or parts or components thereof.

A further object of the invention is to provide a conveying plant in which work pieces of different shapes and sizes can be transported from one working station to another one and can be securely held in each working position so that they cannot be unintentionally displaced by reaction forces during the working processes.

A further object of the invention is to provide a conveying plant, in which elected work pieces of a series of transported work pieces can miss one or a plurality of working stations and ca re-enter that series of work pieces.

One further object of the invention is to provide a conveying plant in which a plurality of work piece carriers are used, which are of the same shape and size and which are capable to securely hold one or more work pieces of different shapes. Preferably exchangeable masks shall be used on or within the work piece carriers to hold the work pieces in a form-fit manner.

Last not least it is an object of the invention to provide a conveying plant in which a main drive shaft is used from which all movements of a conveying rail are derived and which also is provided with cam discs to operate clamping means in order to securely hold the work piece carriers in place during processing the work pieces at a plurality of working stations.

These and other objects, features and advantages of the invention will become apparent from the following description of preferred embodiments in connection with the drawings and the appended claims.

DESCRIPTION OF THE PREFERRED EMBODIMENTS

Figure 1:
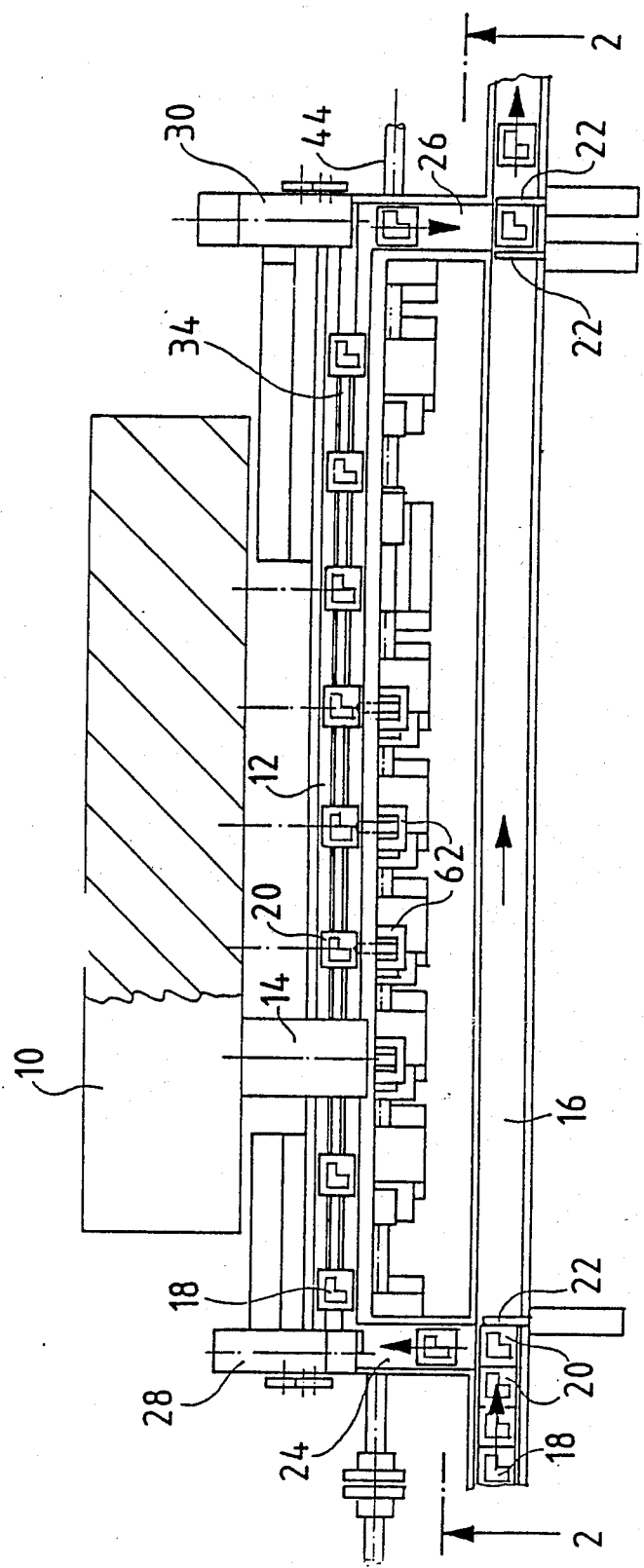
FIG. 1 is a schematic plan view of one embodiment of a conveying plant according to the invention.

In front of and along a processing machine 10, for example an automatic cutting and bending machine a guide rail 12 is arranged such that it runs below a plurality of seriesly arranged processing units 14 of the machine 10. A plurality of work piece carriers 20 each carrying a work piece 18 are supplied in a guide path 16 by an endless conveying belt. A cross slider 22 in its extended position shown in FIG. 1 blocks the guide path 16. Immediately ahead of the cross slider 22 a connecting path 24 branches from the guide path 16 at right angles and runs into the guide rail 12. At the other end of the guide rail 12 a further connecting path 26 connects the guide rail 12 with the guide path 16. Ahead and behind of the area of connection of the connecting path 26 and the guide path 16 cross sliders 22 are arranged respectively. A push-in device 28 is arranged at the connecting path 24 and is extensible therealong in order to push that one of the work piece carriers 20 which rests at the cross slider 22 along the connecting path 24 into guide rail 12. If the work pieces 18 on the work piece carriers 20 standing ahead of the pushed-in work piece carrier 20 are not to be processed in the machine 10 the cross slider 22 is retracted so that the work piece carriers 20 are moved on the guide path 16 until they abut against the first cross slider 22 at the connecting path 26. Both cross sliders 22 ahead and behind of the connecting path 26 are retracted when a push-out device 30 operable to take off a work piece carrier 20 at the end of the guide rail 12 and to push it along the connecting path 26 into the guide path 16 is inoperative. Therefore, those carriers 2o carrying work pieces 18 which are not to be processed by machine 10 are conveyed along guide path 16 by-passing the guide rail 12.

The guide path 16 consists of a pair of guide bars between which a endless belt is arranged which forms the conveying means as it is known in the art.

Figure 9:
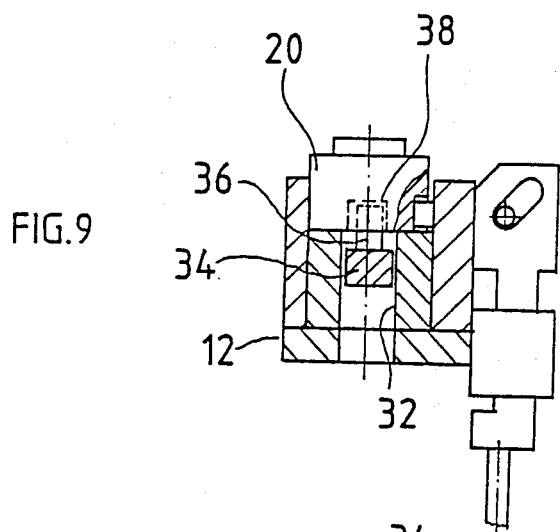
FIG. 9 is a schematic cross-setional view of the guide rail in the embodiment shown in FIG. 1 to 3.
Figure 10:
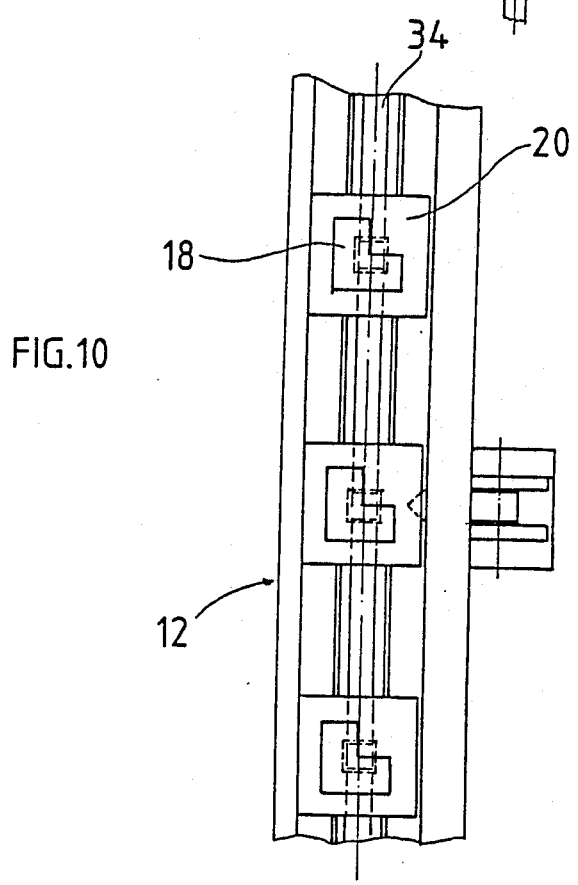
FIG. 10 is a plan view of the guide rail according to FIG. 9.

The guide rail 12 has a longitudinal bottom slot 32—as seen in FIGS. 9 and 10—in which a conveying rail 34 is arranged which extends over the greatest portion of the length of the guide rail 12 and which is provided with upwardly extending dogs 36 at equal interspaces x. The dogs 36 project into bottom recesses 38 of the work piece carriers 20 when the conveying rail 34 is in conveying position (FIG. 9). The effective length of the conveying rail 34 as measured between the first dog 36 neighbouring the push-in device 28 and the last dog 36 near the push-out device 30 is smaller than the length of the guide rail 12 as measured between the central lines of the connecting pathes 24,26 exactly by the interspace x between each adjacent dogs 36.

The ends of the conveying rail 34 have a dovetail cross-section and are displaceably guided in supports 40 which are fastened at lifting bars 42. On a main drive shaft 44 extending parallel with the guide rail 12 cam discs 46 are fastened, the peripheries thereof contacting rollers 48 at brackets of the lifting bars 42. The cam discs 46 have two peripherally spaced circular portions of different diameters and two short ramp portions connecting the circular portions respectively. Therefore, the lifting bars 42 and also the conveying rail 34 are lowered by a small amount sufficient to disengage the dogs 36 from the recesses 38 of the work piece carriers 20, then are held for a predetermined period on the lowered level until they are raised again and then remain at this elevated level for a certain period. Thereafter the cycle is repeated.

Figure 3:
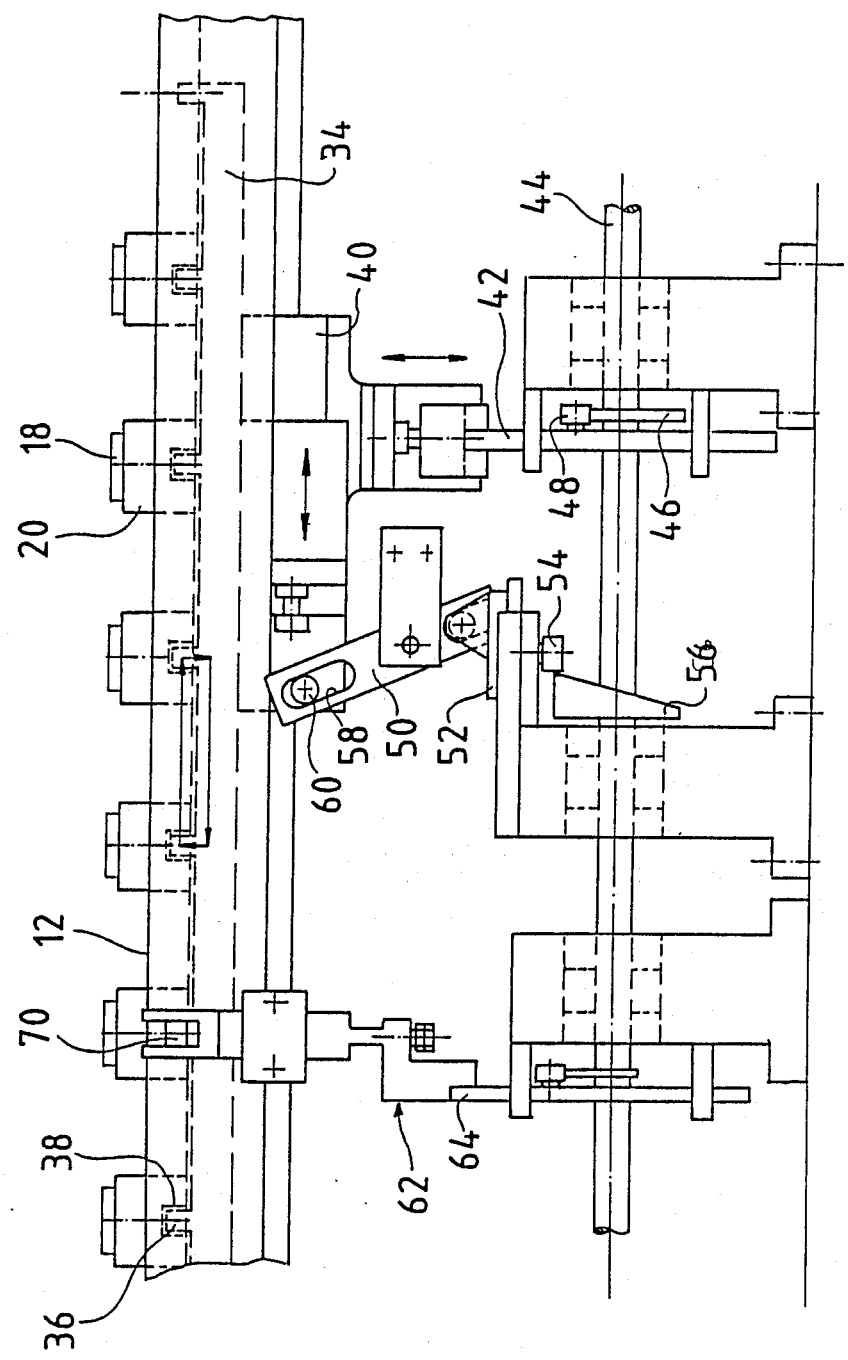
FIG. 3 is a view of a portion of the conveying plant substantially as in FIG. 2 but shown in greater detail.

For horizontal reciprocation of the conveying rail 34 a pivoting lever 50 is pivoted at a slide 52 which is parallely displaceable with respect to the conveying rail 34 in a guide. The slide is provided with a roller 54 which is in contact with a front side cam surface of a cam drum 56 fastened on that main drive shaft 44. A stem 60 of the conveying rail 34 projects into a slot 58 at the upper end of the pivoting lever 50. The cam drum 56 reciprocates the conveying rail 34 horizontally only during the standstill periods of lifting bars 42. Therefore, the conveying rail 34 moves along a rectangle path as shown in FIG. 3 by 4 arrows connecting one another in form of a rectangle.

Figure 2:
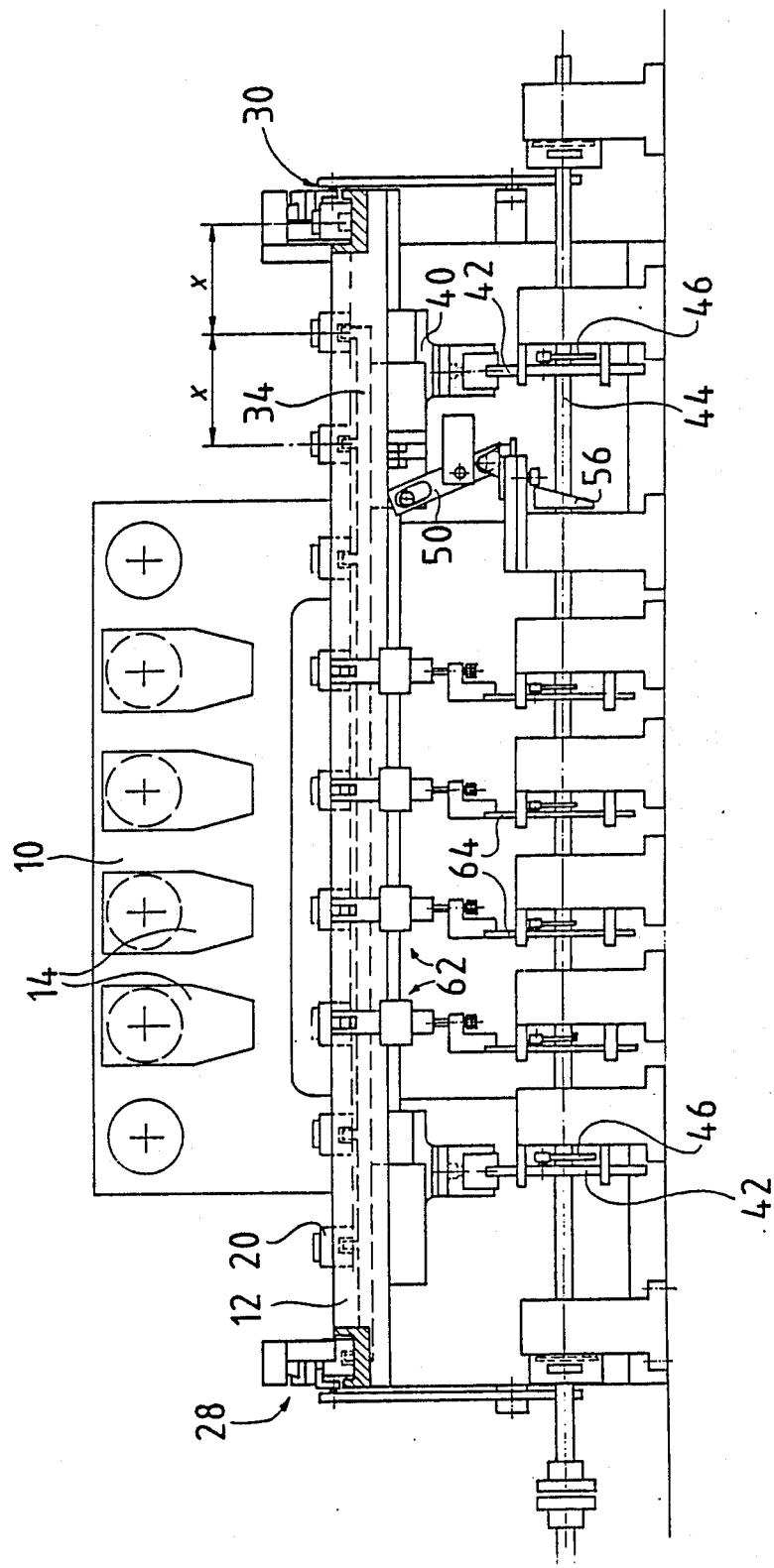
FIG. 2 is a cross-sectional view taken along line 2—2 of FIG. 1.

Beginning with the arrangement according to FIG. 2 the conveying rail 34 is at first moved to the right by the distance x, whereby all work piece carriers 20 on the guide rail 12 are displaced by the length x. The processing units 14 are also spaced from one another by this length x, so that the work piece carriers 20 are moved in working position exactly below the processing units 14 respectively.

After the pivoting lever 50 has been swung to the right in the end position thereof all work piece carriers 20 are clamped in their working positions at the guide rail 12 by a plurality of clamping devices 62. One of them belongs to each one of the working positions. Each clamping device as shown in FIGS. 1 to 3 is similarly designed as the lifting and lowering devices, for the conveying rail 34 and comprises a cam disc fastened on the main drive shaft 44, a roller contacting the cam disc and mounted at a lifting bar 64 which at its upper end has a diagonal slot 66 into which engages a stem 68 fastened at a slide 70 which is displaceably mounted at right angles to the guide rail 12 in one side wall thereof. The front end of the slide 70 is wedge-shaped and the work-piece carriers 20 are provided with lateral recesses having a wedge-shape which is complementary with that of the slide 70, so that upon lifting the lifting bar 64 the slide 70 is displaced towards the work piece carrier 20 and comes into engagement with the recess therof whereby firstly the carrier 20 is precisely adjusted in longitudinal direction of the guide rail 12 and then is securely clamped thereon. That side wall of the guide rail 12 opposed to the slides 70 has an inclined upper inner surface 72 which contacts and overgrips a corresponding inclined side surface of the work piece carrier 20, so that the slide 70 presses the work piece carrier 20 against the inclined inner surface 72 and thereby also down onto the bottom of the guide rail 12. After this has been done the conveying rail 34 makes its disengaging lowering stroke, the horizontal return stroke and the raising re-engaging stroke. During these 3 strokes all work pieces 18 on their carriers 20 are simultaneously processed by the processing units 14. Then the lifting bar 64 of each clamping device 62 is lowered and the slide 70 is retracted out of the path of the carriers 20 so that thereafter the carriers 20 by the conveying rail 34 can be displaced by a further working stroke with the amount x.

Figure 11:
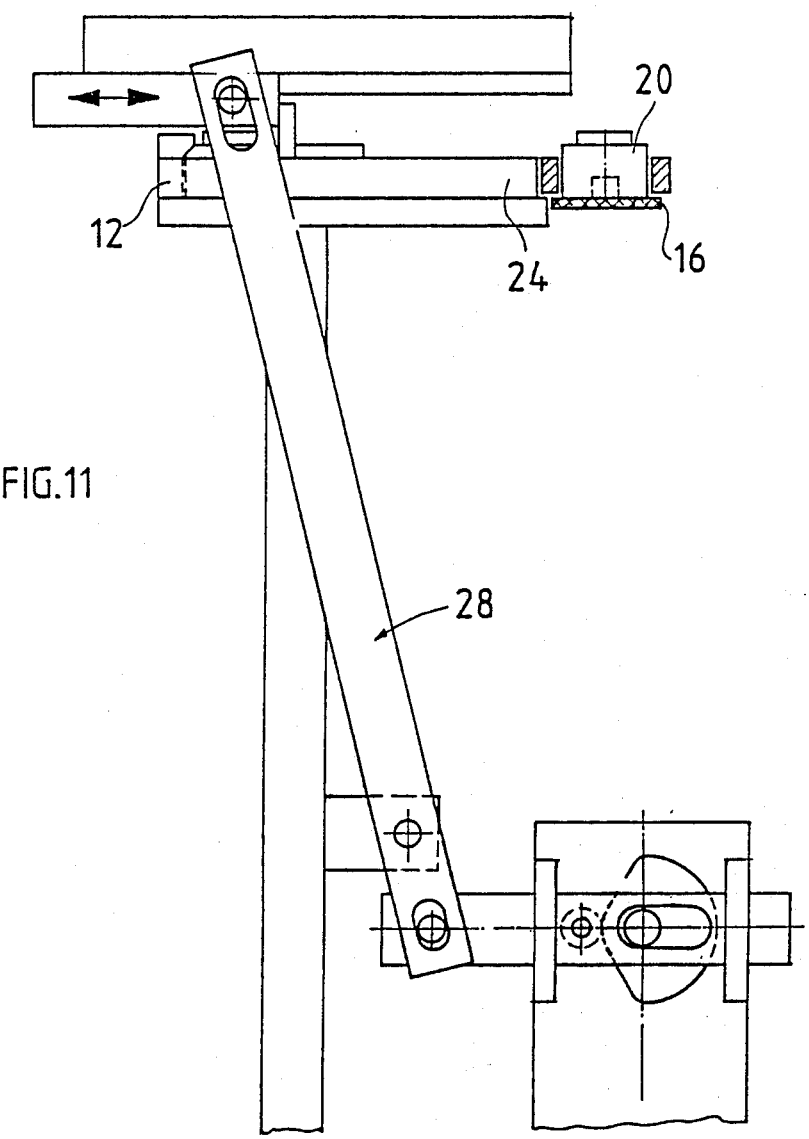
FIG. 11 is a schematic elevational view of a push-in device for conveying work piece carriers from a main moving path into the guide rail arranged along a processing machine.

During the moving phases excluding the working stroke of the conveying rail 34 the push-in and push-out devices 28, 30 operate, the manner of which is schematically shown in FIG. 11. A cam disc on the main drive shaft 44 reciprocates a slide via a roller mounted thereon. The slide is operatively connected with the lower end of a swinging arm by a stem engaging a slot in the swinging arm. In the same way an upper slide is operatively connected with the upper end of the swinging arm. The upper slide comprises a gripper plate which projects into the moving pathes of the connecting paths 24,26. In the case of the push-in device 28 the gripper plate is pivoted at the slide so that it is swung in clockwise direction beyond the work piece carrier 20 when it moves to the right. During its travel to the left the gripper plate abuts at a projection of the slide and then draws a work piece carrier from the guide path 16 along the connecting path 24 into the guide rail 12. In case of the push-out device 30 the gripper plate is fixed at its slide.

The embodiment according to FIGS. 4 to 8 differs from the aforementioned embodiment principally in that the conveying rail 34 is arranged laterally close to the guide rail 12. Instead of the lifting bars 42 swinging arms 74 are provided which by means of a cam disc 76 on the main drive shaft 44 are operated by a horizontal slide 78 provided with a roller respectively. A head is provided at the upper end of the swinging arm 74 and carries the support 40 in which the conveying rail 34 is mounted for reciprocation by a dovetail guide. The disengagement and re-engagement strokes of the conveying rail 34 take place in the directions of the double arrow in FIG. 6. The recess 38 at the work piece carrier are not provided in the bottom as in the embodiment according to FIGS. 1 to 3 and 9 but in one side wall thereof, so that the dogs 36 also laterally projecting from the conveying rail 34 can engage into the recesses 38 from the side. The embodiment according to FIGS. 4 to 8 has the advantage that the processing machine 10 can additionally be equipped with a lower row of processing units 14 which for example can bend the work pieces 18 from below whereby the bending tools during the processing operation project upwards through the guide rail 12 and the work piece carriers 20. For this reason the guide rail 12 has bottom openings 80 in the area of each working position and the work piece carriers 20 are provided with passages 82 through which the work pieces 18 are accessible from below.

Figure 4:
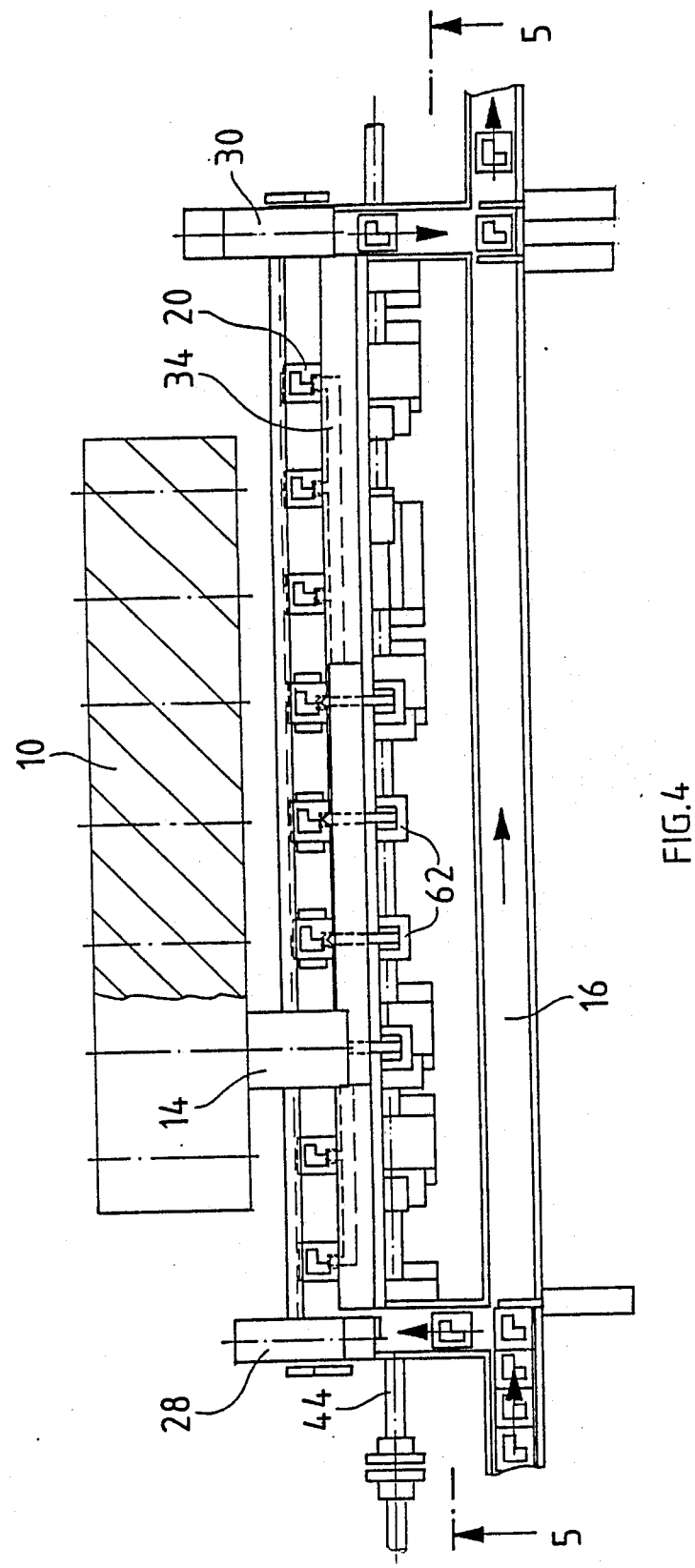
FIG. 4 is a plan view of a modified embodiment of a conveying plant.
Figure 5:
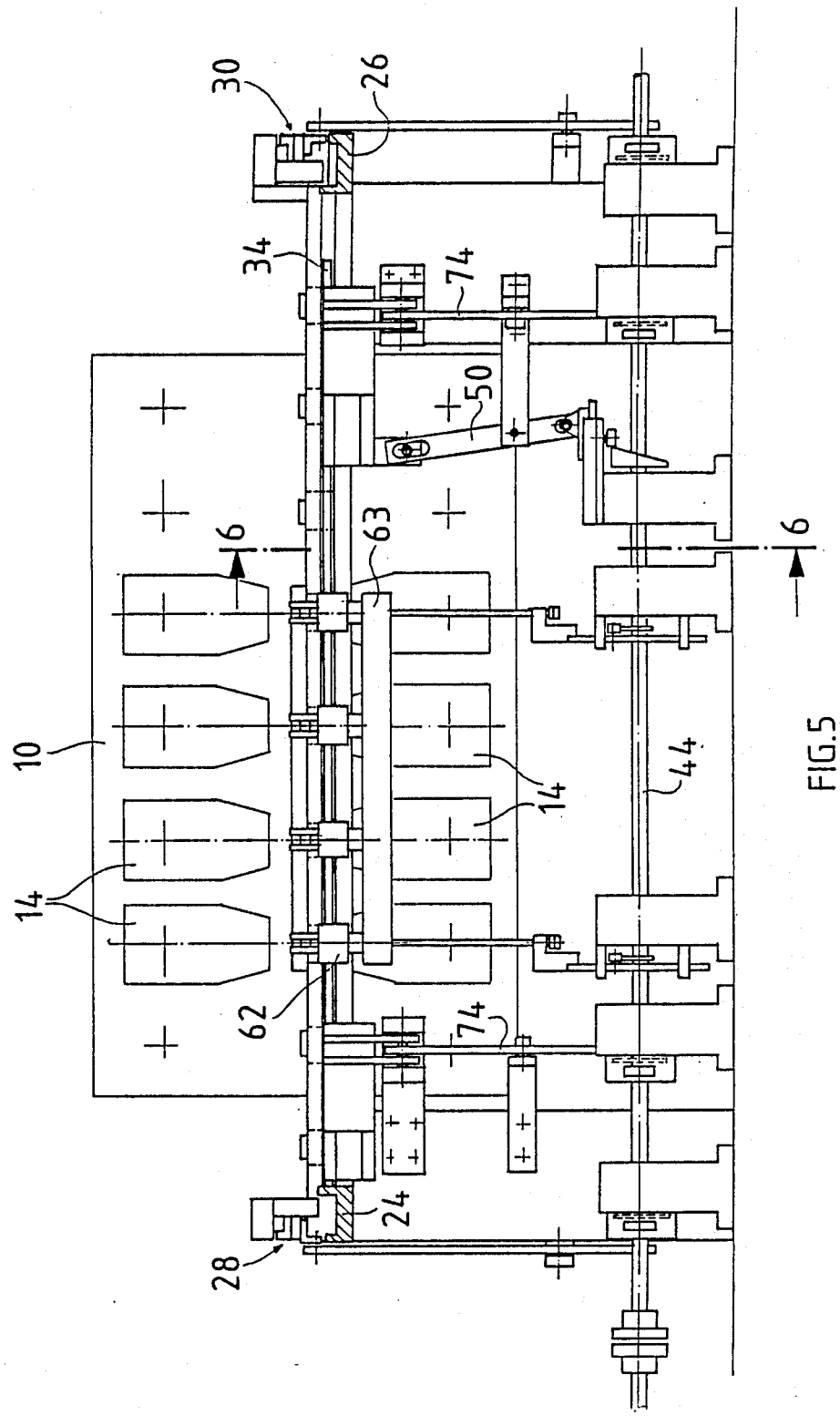
FIG. 5 is a sectional view of the conveying plant taken along line 5—5 of FIG. 4.
Figure 6:
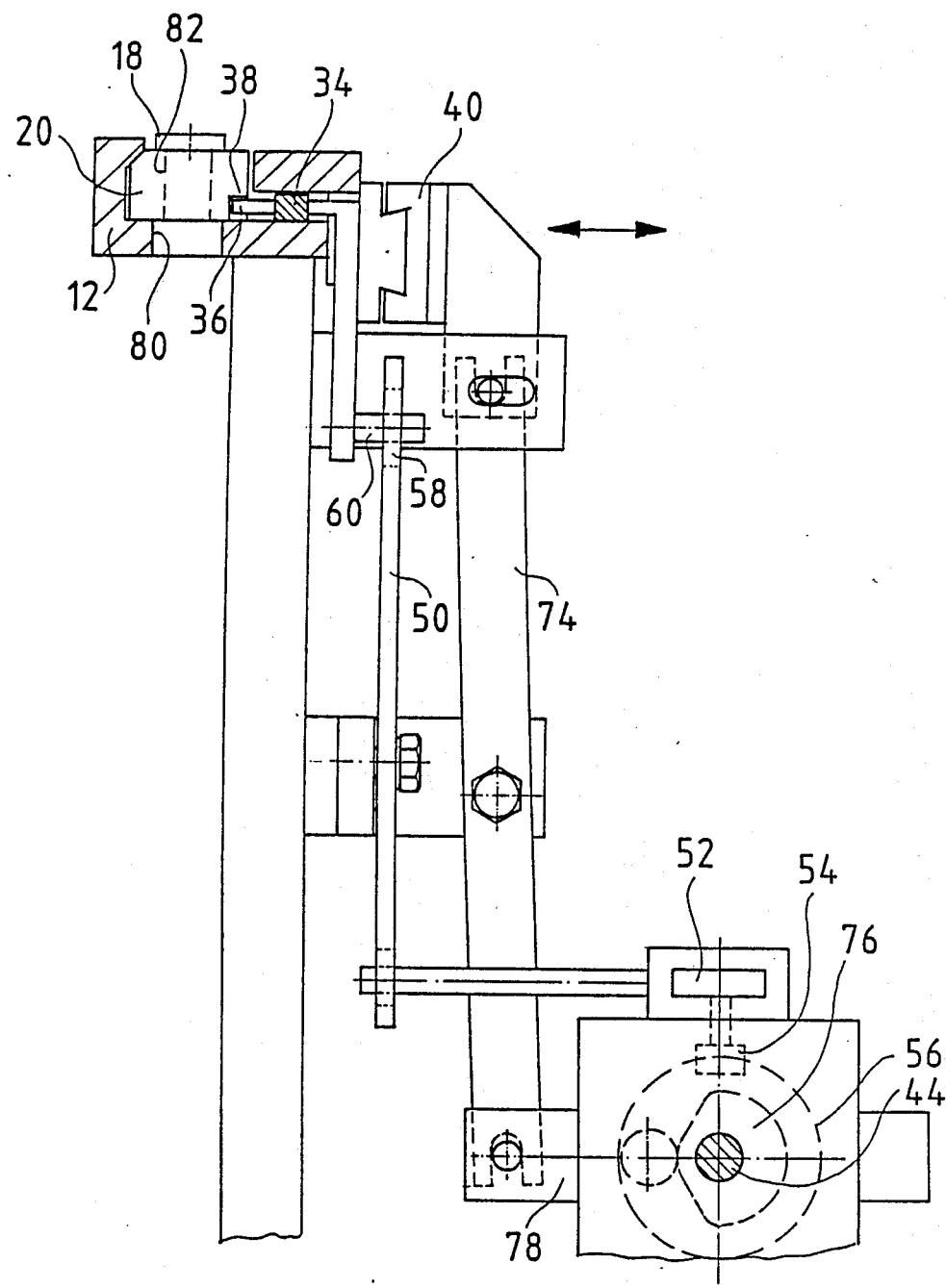
FIG. 6 is a schematic cross-sectional view substantially taken along line 6—6 of FIG. 5.
Figure 7:
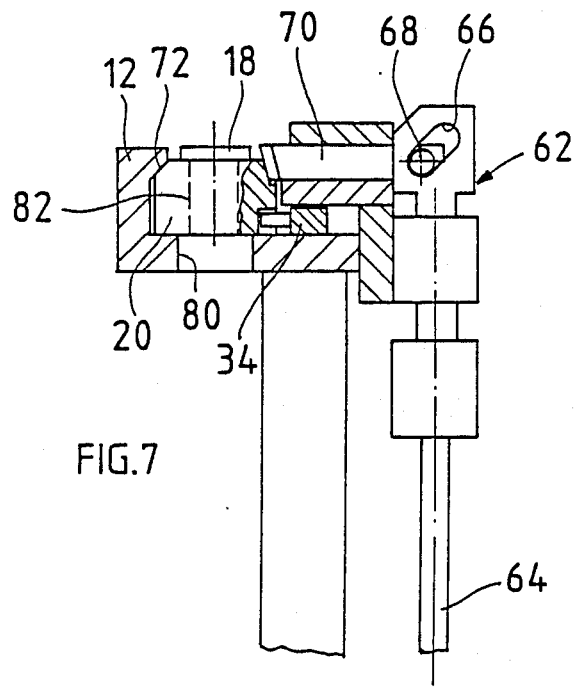
FIG. 7 is a cross-sectional view of a detail of a clamping device for clamping the work piece carriers in a guide rail.
Figure 8:
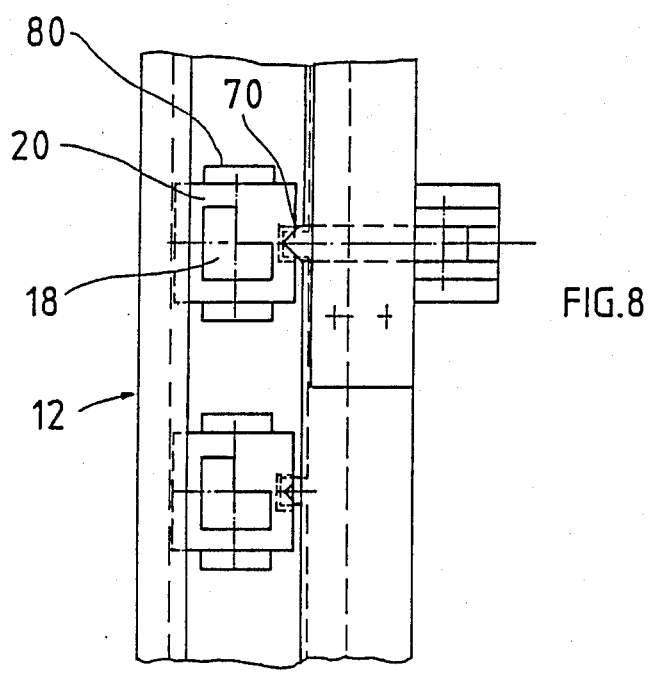
FIG. 8 is a plan view onto the guide rail and the clamping device according to FIG. 7.

The embodiment shown in FIG. 5 differs from the embodiment shown in FIG. 4 in that the clamping devices 62 for all working positions comprise a common clamping bar 63 at which the plurality of slides 70 are fastened and which is raised and lowered by a pair of lifting bars in order to reciprocate the clamping slides 70 as shown in FIG. 7.

I claim:

1. A conveying plant for work-pieces to be processed or assembled one after another at different working positions comprising a guide rail extending longitudinally at said working positions, a push-in device arranged at one end of the guide rail and a push-out device at the other end thereof, a conveying rail arranged parallel with and adjacent to the guide rail, a plurality of dogs provided at the conveying rail at equal interspaces, a drive unit operatively connected to the conveying rail and moving the conveying rail along a continuously repeated substantially rectangular moving path consisting of a working stroke in longitudinal direction of the guide rail, a disengaging stroke, a return stroke parallel to the working stroke and a re-engaging stroke, a plurality of work-piece carriers guided at the guide rail and carrying at least one work-piece respectively, said plurality of work-piece carriers adapted to be simultaneously engaged by said dogs in a form-fit way and to be shifted forward during the working stroke of the conveying rail, and a plurality of clamping devices provided at said working positions respectively and operatively connected with drive means to simultaneously clamp the plurality of work-piece carriers at the guide rail during at least a portion of the rectangular moving path excluding said working stroke, said guide rail having a pair of opposed side walls spaced from one another by a distance substantially equal to the width of the work-piece carriers, a first one of said pair of walls having an inclined inner contact surface at the upper end thereof and each work-piece carrier having a complementary inclined side face and wherein the plurality of clamping devices are arranged on the side of the other one of the pair of side walls and during operation thereof urging the work-piece carriers into clamping contact with the first one of said pair of side walls, each one of the plurality of clamping devices comprising a slider having a tapered end which, in a clamping position, engages an opening of complementary shape of the work-piece carrier, and during movement of the slider into that clamping position, the slider is displaced toward the carrier and comes into engagement with the opening of complementary shape, whereby, firstly the carrier is adjusted in longitudinal direction of the guide rail and secondly the carrier is clamped.

2. A conveying plant as claimed in claim 1, wherein the plurality of clamping devices comprises one clamping rail extending parallel to the guide rail and carrying the plurality of sliders and a drive mechanism is operatively connected with the clamping rail to reciprocate the clamping rail at right angles to the longitudinal direction thereof.

3. A conveying plant as claimed in claim 1, wherein the bottom of the guide rail is provided with openings at least at the areas of the working positions, the openings forming passages for processing tools, and wherein the work piece carriers are provided with vertical through-holes through which the at least one work piece placed on the work piece carrier is accessible from below, and wherein the conveying rail is arranged laterally close to the guide rail.

4. A conveying plant as claimed in claim 1, wherein a guide path extends in parallel relationship to the guide rail, and connecting paths branch from said guide path at the areas of the push-in and push-out devices respectively and run into the guide rail and wherein at least by one cross slider arranged in the area of the guide path at at least one of the connecting paths the guide path can be blocked so that the cross slider in the operational position thereof separates the guide path in two guide path sections only one thereof being in connection with the connecting path.

5. A conveying plant as claimed in claim 1, wherein the drive unit moving the conveying rail comprises a swinging lever reciprocating the conveying rail with standstill intervals during the working and return strokes and driven by a cam of a rotating drum and further comprises a pair of cam-controlled shifting means provided with slide guides in which the conveying rail is slidably supported and the pair of shifting means move the conveying rail at least substantially rectangularly to the longitudinal direction thereof when the swinging lever is at least near to each one of its end positions and during the standstill intervals thereof.

6. A conveying plant as claimed in claim 1, wherein a rotatable main drive shaft is parallely arranged to the guide rail and cam discs are fastened on said main drive shaft, swinging levers are provided, one end thereof being in contact with said cam discs respectively and the other ends thereof pivoted at the clamping sliders of the clamping devices and wherein one pair of cam discs are provided on said main drive shaft to reciprocate the conveying rail in longitudinal directions and another pair of cam drums are fastened on said main drive shaft to move the conveying rail perpendicularly thereto.

7. A conveying plant as claimed in claim 1, wherein the length of the conveying rail as measured between a a first one and a last one of the plurality of dogs is smaller than the overall length of the conveying rail as measured between the central lines of the push-in and push-out devices by an amount equal with the interspace between adjacent dogs.

* * * * *